United States Patent [19]

Ross et al.

[11] Patent Number: 5,207,525
[45] Date of Patent: May 4, 1993

[54] INSTRUMENT SPINDLE WITH RELIEF DESIGN

[75] Inventors: David A. Ross, Columbiaville; Arnold R. Eick, Grand Blanc, both of Mich.

[73] Assignee: Delco Electronics Corporation, Kokomo, Ind.

[21] Appl. No.: 874,456

[22] Filed: Apr. 27, 1992

[51] Int. Cl.⁵ .............................. B25G 3/00
[52] U.S. Cl. ..................... 403/11; 403/345; 403/361
[58] Field of Search ........... 403/345, 361, 292, 26, 403/11

[56] References Cited

U.S. PATENT DOCUMENTS 4,273,462  6/1981  Fukuchi ..................... 403/292 X
4,361,979  12/1982  Petersson ................... 403/392 X
4,886,392  12/1989  Iio ............................ 403/345 X

FOREIGN PATENT DOCUMENTS 932739  7/1963  United Kingdom ............. 403/292

Primary Examiner—Andrew V. Kundrat
Attorney, Agent, or Firm—Anthony Luke Simon

[57] ABSTRACT

A spindle for use in an instrumentation apparatus comprises, on an end of the spindle inserted into a cavity defined by a pointer shaft, (i) a surface for engagement to the pointer shaft and (ii) a recessed surface proximal to the engagement surface and inserted into the cavity without engaging the pointer shaft. The improved spindle is easily manufactured and reduces the maximum force required to stake the pointer shaft to the spindle.

11 Claims, 3 Drawing Sheets

INSTRUMENT SPINDLE WITH RELIEF DESIGN

This invention relates to instrumentation devices and, more particularly, to instrumentation devices incorporating an improved spindle design.

BACKGROUND OF THE INVENTION

In instrumentation displays, devices such as air core gauges are used to indicate measures of parameters through varied rotation of pointers, which are viewed against graphic displays. In the manufacture of these instrumentation devices, the pointer is attached to a spindle of the gauge in a process called staking. Fundamentally, staking involves simply pressing the pointer onto the spindle in a desired manner. During the staking process, it is desired to limit the amount of force necessary to press the pointer onto the spindle. If excess force is required to stake the pointer to the spindle, damage to the pointer or the rest of the instrumentation device may result.

FIG. 1 is an illustration of a prior art spindle 16 and pointer shaft 10. The circular cylinder-shaped spindle 16 fits into the circular cylinder-shaped opening 14 of the pointer shaft 10 to provide a friction or press fit. The outer surface 15 of the spindle 16 contacts the inner surface 12 of the pointer shaft 10. The amount of force required to press the pointer shaft 10 onto spindle 16 is proportional to the amount of surface area contact between surface 15 and surface 12. The amount of force required to press pointer shaft 10 onto spindle 16 is also related to the interference of the pointer and spindle diameters, surface finish quality, coefficients of friction, etc.

FIG. 2 illustrates a force/engagement distance diagram for the staking of the prior art pointer and spindle shown in FIG. 1. The trace 17 shows that, as the the pointer shaft 10 is pressed further onto spindle 16, the force required to continue pressing the pointer shaft 10 on the spindle 16 increases.

FIG. 3 shows a prior art pointer shaft 18 that limits the force necessary for staking between the pointer shaft 18 to the spindle 16. During the staking process, the opening 19 is placed over spindle 16. The outer surface 19 of the spindle engages with the surface 20, the pointer shaft 18 The area of engagement is limited, however, as surface 22 of the pointer shaft is recessed from the surface 20 and does not engage the spindle 16.

Construction of the prior art pointer is shown in FIG. 3 can be fairly complex. The pointer shaft 18 must be molded with an extra mold pin or machined from opening 24 in order to provide the recessed surface 22. A cap (not shown) must then be placed on the pointer to hide the hole at opening 24 from a person viewing the instrumentation device.

SUMMARY OF THE PRESENT INVENTION

This invention provides an improved instrumentation spindle design that limits the amount of force necessary to accomplish staking of the pointer to the spindle. Through implementation of this invention, scrap rate of instrumentation pointers and instrumentation devices may be reduced due to the elimination of excess staking forces.

Advantageously, this invention provides an apparatus which accomplishes limited force in the engagement of the pointer to the spindle without requiring more expensive molding or machining of the instrumentation pointer and addition of a cap. Advantageously, in one embodiment, the apparatus of this invention also provides an instrumentation spindle with a symmetrical design that allows for easier assembly of the spindle to the instrumentation unit through elimination of the possibility of an improper orientation.

Structurally, the apparatus of this invention comprises an elongated substantially cylindrical spindle for use in an instrumentation device, the spindle having an end that is to be engaged with a pointer shaft. The engagement end comprises a first surface area to be frictionally engaged with an inner surface of the pointer shaft. A second surface area, recessed from the first surface area, is within a cavity defined by the pointer shaft but does not engage the pointer shaft. In this manner, the apparatus of this invention provides a spindle to which a pointer shaft may be staked with a limited maximum staking force.

DETAILED DESCRIPTION OF THE INVENTION

Figure 1:
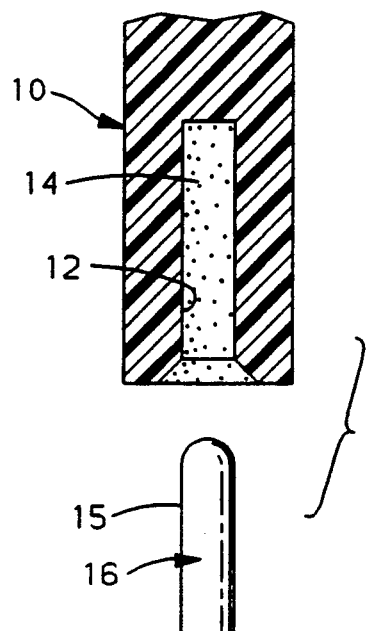
FIGS. 1-3 illustrate the prior art described above.
Figure 2:
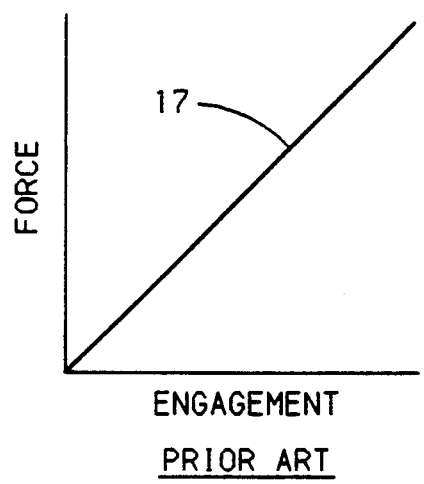
Figure 3:
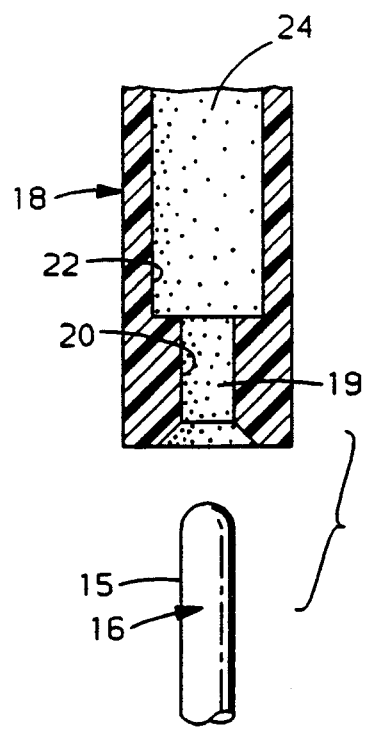
Figure 4:
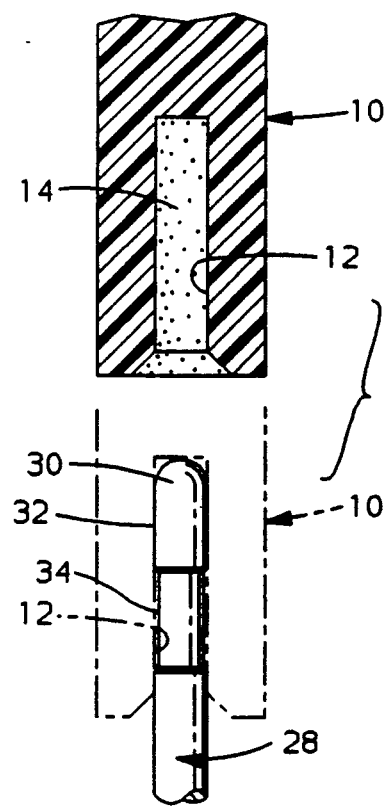
FIG. 4 is an illustration of the apparatus of this invention.

Referring to FIG. 4, the spindle 28 of this invention has an end 30 that is to be inserted in the opening 14 of the pointer shaft 10. Pointer shaft 10 is typically cylindrical in shape and has bored in it the opening 14 defining a cylindrical cavity that is tapered at the opening as shown. The spindle 28 of this invention has a surface 32 near the end 30 that engages the surface 12 of the pointer shaft 10. When the pointer shaft 10 is pressed or staked onto the spindle 28, the surfaces 12 and 32 engage to form a press fit or friction fit which retains the pointer shaft onto the spindle 28. The dotted lines show pointer shaft 10 when it is completely engaged with spindle 28. In the process of pressing the pointer shaft 10 onto the spindle 28, the amount of force required to press pointer shaft 10 further onto spindle 28 is proportional to the area of contact between inner surface 12 of the pointer shaft 10 and engagement surface 32 of the spindle.

Surface 34 of the spindle, which is immediately adjacent to surface 32, is machined to be recessed so that it does not contact the inner surface 12 of the pointer shaft 10 while within the cylindrical cavity of pointer shaft 10. This recessing of surface 34 limits the amount of surface area engagement between the spindle 28 and pointer shaft 10. This limited surface area engagement, in turn, limits the amount of force necessary to press the pointer shaft 10 on the spindle 28.

Figure 5:
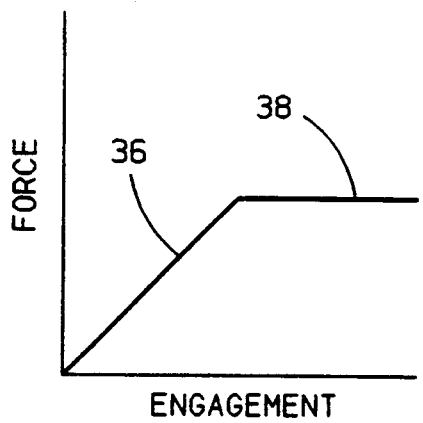
FIG. 5 is a force diagram showing the benefits of the apparatus of this invention.

As shown in FIG. 5, during the staking when the pointer shaft 10 engages the spindle 28, the staking force is steadily increased as the amount of surface 32 in contact with inner surface 12 increases. This is shown by the portion 36 of the graph in FIG. 5. Once the surface 34 of spindle 28 is within the cavity defined by pointer shaft 10, the force required to press the shaft 10 further onto spindle 28 ceases to increase and remains steady as the maximum staking force, as illustrated by the portion 38 of the graph in FIG. 5. This manner of limiting the force required to press pointer shaft 10 onto the spindle 28 reduces the amount of scrap resulting from assembly of instrumentation devices through elimination of excess force loading between the pointer shaft 10 and the spindle 28.

For the best results, the engagement surface 32 of spindle 28 has a length of at least substantially double the diameter of the spindle 28 (an example spindle diameter is 1.100 mm, as measured at the engagement surface 32). A length for surface 32 of less than double the diameter of the spindle 28 operates to retain the pointer shaft on the spindle, but may result in a cocking of the pointer shaft 10 with respect to the spindle 28. An example length for surface 32 with suitable limited staking force is 4 mm.

Figure 6:
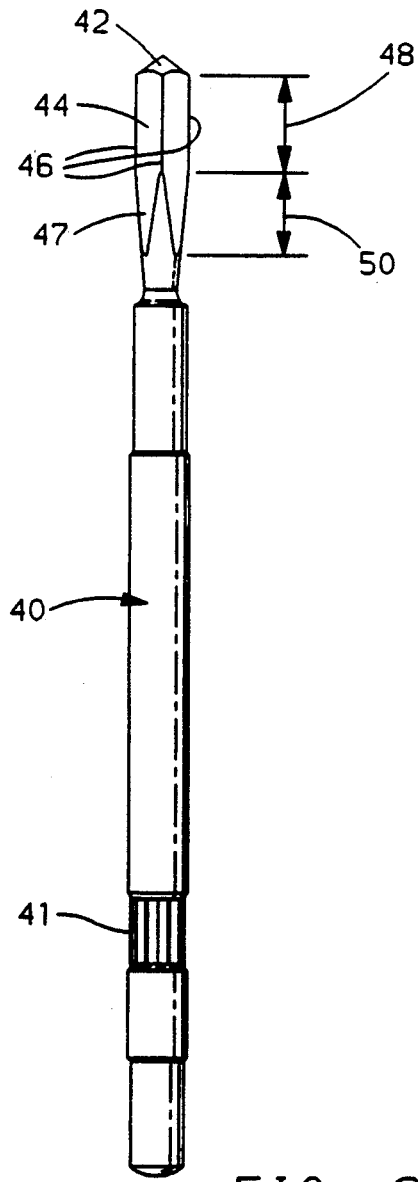
FIGS. 6 and 7 are additional examples of the apparatus of this invention.

FIG. 6 shows an example alternative implementation of this invention. The spindle 40 shown has an end 42 that engages with a pointer shaft. The engagement area of the pointer shown by reference 48, comprises a machined square portion 44 with corner edges 46 that actually engage the pointer in the case of a round cylindrical opening of the pointer shaft. The area defined by reference 50 in the figure illustrates the recessed portion 47 of the spindle which does not engage with the pointer shaft and limits the force necessary for the staking operation. The recessed portion 47 is conical in shape and is obtained through machining the spindle at portion 47. The spindle 40 shown includes portion 41 to which a rotor is mounted for implementation into an air core gauge.

Figure 8:
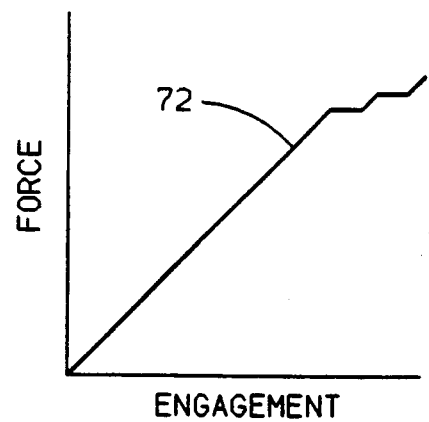
FIG. 8 is a force diagram of the apparatus of this invention for the example shown in FIG. 7.
Figure 7:
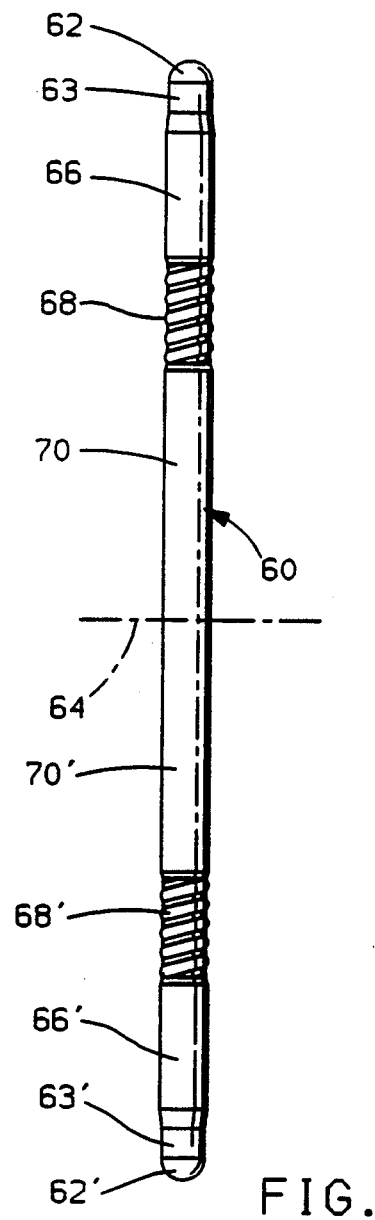

The third example implementation of this invention, shown in FIG. 7, includes a spindle 60 with an end 62 that engages with a pointer shaft. At the end 62, surface 66 provides the friction fit engagement and surface 68, comprising a thread design machined into the spindle, provides a recess that limits the amount of engagement force. If the outer diameter of the thread portion 62 is equal to the engagement area 66, the force limitation is not absolute as shown in FIG. 5, but limited in the manner shown in FIG. 8. As the trace 72 shows, the force increases steadily as the surface 12 (FIG. 4) of the pointer shaft 10 engages surface 66 and then levels off when the thread portion 68 is reached. The force then increases in small steps as more threads of the thread portion 68 engage with the surface 12 of the pointer shaft 10.

In addition to the force limitation and manufacturing advantages provided by this invention, the unique advantage of the symmetry shown in FIG. 7 of spindle 60 about mid-point 64 is provided. This symmetry about mid-point 64 provides that, in assembly of an instrumentation device, there can be no wrong orientation of the spindle 60.

More particularly, the spindle 60 defines an elongated cylindrical spindle with first and second ends 62 and 62' on opposite sides of the mid-point 64. Either of the end portions 63 and 63' of each end 62, 62' may be used as a rotational surface within a first bearing of an instrumentation device. Proximate to each end 62 and 62' is a surface 66 or 66'. Either of the surfaces 66 or 66' may be used as the engagement area of the spindle.

Proximate to the surfaces 66 and 66', immediately closer to the mid-point 64 therefrom, are the threaded portions 68 and 68'. The threaded portions 68, 68' define a recessed area as explained above for the purposes of force limiting. The threaded portions 68 and 68' also define a mounting means through which a rotor may be mounted onto the spindle. A rotor may be mounted through press fit or molding the rotor or a rotor bushing to the threaded portion 68 or 68'. The geometry of the threaded portions provide that the fitting of the rotor or rotor bushing is substantially non-rotatable with respect to the spindle 60. In this manner, when forces in the instrumentation device act on the rotor (not shown) to force rotation of the rotor, rotation of the spindle is also forced. Between the mid-portion 64 and the threaded portions 68 and 68' are cylindrical portions 70 and 70', both of which are suitable for rotational mounting in a second bearing of the instrumentation device.

Figure 9:
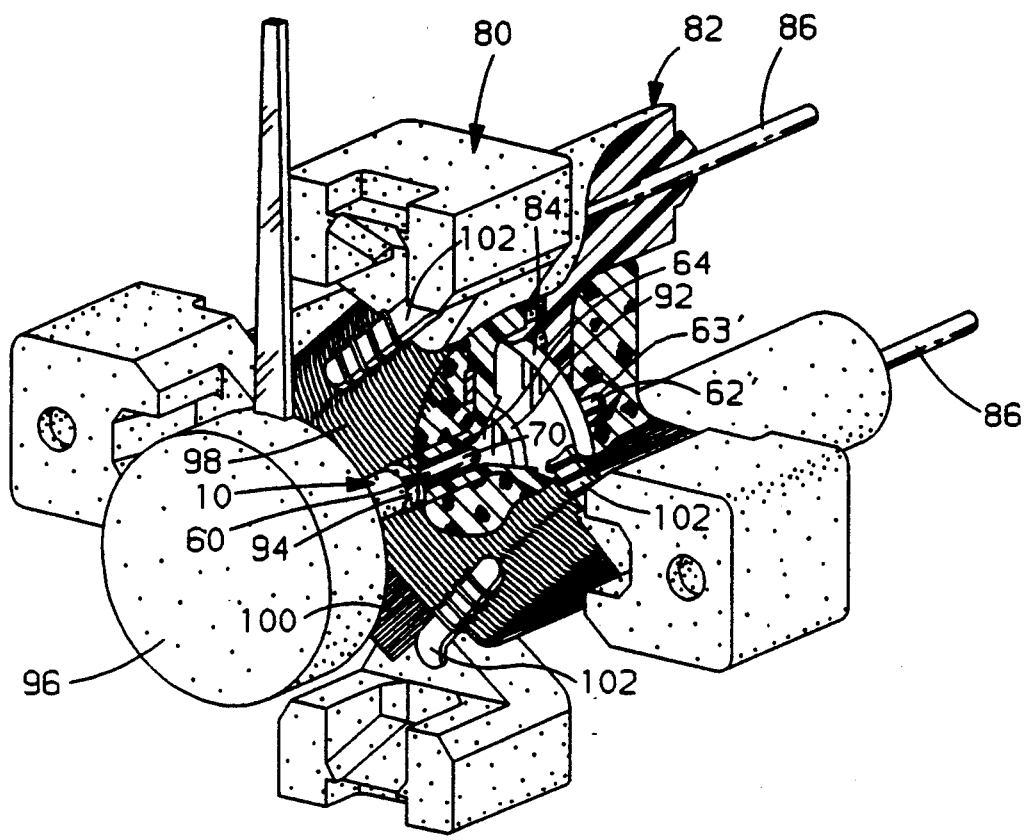
FIG. 9 is an illustration of the apparatus of this invention assembled in an instrumentation device.

Referring to FIG. 9, a completed instrumentation device of a type which may be used with any of the examples of FIGS. 4, 6 or 7 is shown. The device is explained with reference to the example spindle 60 of this invention shown in FIG. 7. The device shown comprises upper bobbin 80 and lower bobbin 82, which when assembled together, define a cavity in which rotor 84 mounted on bushing 92 to spindle 60 is freely rotatable. The end 62' and rotational surface 63' are rotatably retained in a lower bearing defined by the lower bobbin 82. The bushing 92, to which the rotor 84 is mounted, is mounted to the spindle 60 at the thread portion 68'. The portion 70 of the spindle 60 is mounted in an upper bearing 64 defined by upper bobbin 80.

A pointer 96 is affixed, i.e., through staking, to the end 62 of the spindle 60 with pointer shaft 10 engaged over and covering engagement surface 66 and threaded portion 68 of the spindle 60. Around the upper and lower bobbins 80 and 82 are wound coils 98 and 100 in a manner well known to those skilled in the art. The coils 98 and 100 are soldered to connectors 102, which are connected to connectors 86. Electric current is applied to the coils 98 and 100 through connectors 86 to operate the instrumentation device shown in the manner well known to those skilled in the art. The assembly shown may be assembled into a can to shield the device from stray magnetic fields in a manner well known to those skilled in the art.

As a further illustration of the benefits of the spindle shown in FIG. 7, FIG. 9 shows the end 62' in the bearing defined by the lower bobbin 82. However, during the assembly of the instrumentation device, the spindle 60 may be inverted and the end 62 may be placed in the bearing defined by lower bobbin 82 and the end 62' is then inserted into pointer shaft 10 and engaged by surface 66' with force control provided by threaded portion 68'.

The above described implementations of this invention are example implementations. Various other improvements and modifications to the examples shown above may occur to those skilled in the art and such improvements or modifications will fall within the scope of this invention as defined below.

The embodiments of the invention in which an exclusive property or privilege is claimed are defined as follows:

1. A spindle for use in an instrumentation apparatus comprising:
    on an end of the spindle inserted into a cavity defined by a pointer shaft, (i) a surface for engagement to the pointer shaft; and (ii) a recessed surface proximal to the engagement surface and inserted into the cavity without engaging the pointer shaft.

2. The apparatus set forth in claim 1 wherein engagement surface has a substantially circular cylindrical shape.

3. The apparatus set forth in claim 1 where the engagement surface has a square shape.

4. The apparatus set forth in claim 1 wherein the recessed surface has a substantially circular cylindrical shape.

5. The apparatus set forth in claim 1 wherein the recessed surface has a substantially conical shape.

6. The apparatus set forth in claim 1 wherein the engagement surface has a length at least substantially double a diameter of the spindle.

7. A substantially cylindrical spindle having a mid-point and first and second ends of which the first end is engaged with a pointer shaft, the improvement comprising:
   an engagement area at the first end of the spindle; and
   immediately proximal to the engagement area, between the first end and the mid-point, a recessed area that limits the force necessary to stake the pointer shaft to the spindle.

8. The apparatus set forth in claim 7 wherein the recessed area comprises a screw thread design.

9. The apparatus set forth in claim 7 wherein the spindle is symmetrical about the mid-point such that the first end is also suitable for being rotatably mounted within a bearing and the second end is suitable for both engagement with a pointer and rotatably mounting into a bearing.

10. An instrumentation device spindle comprising:
    an elongated substantially cylindrical member with first and second ends and a mid-point, wherein the first and second ends are symmetrical about the mid-point such that each of the first and second ends defines:
    (i) a portion for rotatable mounting within a first bearing;
    (ii) a portion for friction engagement with a pointer shaft;
    (iii) a rotor mount portion to which a rotor may be mounted; and
    (iv) a portion between the rotor mount portion and the mid-point for rotatable mounting within a second bearing.

11. The apparatus of claim 10, wherein each of the first and second ends also defines (v) a recessed portion for limiting staking force, the recessed portion located proximal to the engagement portion between the engagement portion and the mid-point.

* * * * *